US006978846B2

(12) United States Patent
Kawai et al.

(10) Patent No.: US 6,978,846 B2
(45) Date of Patent: Dec. 27, 2005

(54) POWER TOOL USED FOR FASTENING SCREW OR BOLT

(75) Inventors: Kozo Kawai, Neyagawa (JP); Yoshinori Sainomoto, Sanda (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/924,979

(22) Filed: Aug. 25, 2004

(65) Prior Publication Data
US 2005/0045353 A1 Mar. 3, 2005

(30) Foreign Application Priority Data
Aug. 26, 2003 (JP) .............................. 2003-301899

(51) Int. Cl.[7] .............................................. B25B 23/14
(52) U.S. Cl. ..................... 173/2; 173/176; 173/181; 173/183
(58) Field of Search ................................ 173/2, 4, 176, 173/178, 181, 182, 183, 180, 93, 93.5; 700/173, 700/168; 73/862.21, 862.23

(56) References Cited

U.S. PATENT DOCUMENTS

| 5,284,217 | A | * | 2/1994 | Eshghy ........................ 173/176 |
| 5,289,885 | A | * | 3/1994 | Sakoh ............................. 173/2 |
| 5,361,852 | A | * | 11/1994 | Inoue et al. ................. 173/176 |
| 5,402,688 | A | | 4/1995 | Okada et al. |
| 5,837,907 | A | * | 11/1998 | Ohmi et al. ............. 73/862.23 |
| 5,898,598 | A | * | 4/1999 | Szwast et al. ................. 702/41 |
| 6,385,837 | B1 | * | 5/2002 | Murakami et al. ........ 29/407.02 |
| 6,598,684 | B2 | * | 7/2003 | Watanabe ....................... 173/2 |
| 6,655,471 | B2 | * | 12/2003 | Cripe et al. .................. 173/176 |
| 6,687,567 | B2 | * | 2/2004 | Watanabe .................... 700/168 |
| 6,814,152 | B2 | * | 11/2004 | Ginell ............................ 173/2 |
| 2002/0060082 | A1 | | 5/2002 | Watanabe |

FOREIGN PATENT DOCUMENTS

| DE | 4243069 | 6/1994 |
| EP | 0264698 | 4/1988 |

(Continued)

OTHER PUBLICATIONS

An English language Abstract of Japanese Laid-Open Patent Publication No. 2002-283248.

(Continued)

Primary Examiner—Scott A. Smith
(74) Attorney, Agent, or Firm—Greenblum & Bernstein, P.L.C.

(57) ABSTRACT

In a power impact tool for fastening a screw or a bolt, malfunction that driving of a motor is stopped before the screw or the bolt is fastened completely can be prevented. A fastening judger judged that the fastening operation is completed at least when a torque variation ratio becomes substantially zero and a reference index becomes equal to or larger than a threshold value of trouble judgment. The reference index is a number of impact of a hammer in a term in which the torque variation ratios take positive values, and the threshold value of trouble judgment is calculated with using a maximum value of the torque variation ratio in the term. Since the number of the impact of the hammer due to trouble in fastening operation is smaller than that due to the screw or the bolt is fastened completely, it is possible to distinguish the increase of the torque in the former case from the increase of the torque in the latter case.

17 Claims, 14 Drawing Sheets

FOREIGN PATENT DOCUMENTS

| | | |
|---|---|---|
| EP | 1207016 | 5/2002 |
| GB | 2115940 | 9/1983 |
| JP | 4-322974 | 11/1992 |
| JP | 6-91551 | 4/1994 |
| JP | 9-285974 | 11/1997 |
| JP | 2002-283248 | 10/2002 |

OTHER PUBLICATIONS

English Language Abstract of JP4-322974.
English Language Abstract of JP 9-285974.
English Language Abstract of JP 6-91551.
English Language Abstract of JP 2002-283248.

* cited by examiner

POWER TOOL USED FOR FASTENING SCREW OR BOLT

BACKGROUND OF THE INVENTION

1. Field of the Invention

The present invention relates to a power tool such as an impact driver or an impact wrench used for fastening a screw or a bolt.

2. Description of the Related Art

Conventionally, a power tool used for fastening a screw or a bolt utilizing driving force of a motor has a function automatically stopping driving of the motor when a torque necessary for fastening the screw or the bolt reaches to a predetermined value due to the screw or the bolt is completely fastened.

In a first conventional power tool such as an impact wrench used for fastening a bolt, for example, shown in publication gazette of Japanese Patent Application 4-322974, a number of impact of a hammer is sensed and driving of a motor is automatically stopped when the number of impact reaches to a predetermined reference number.

In a second conventional power impact tool shown in publication gazette of Japanese Patent Application 9-285974, a rotation angle of a bolt is sensed and driving of a motor is stopped when the rotation angle reaches to a predetermined reference angle.

In a third conventional power impact tool shown in publication gazette of Japanese Patent Application 6-91551, an actual torque which is necessary for fastening a bolt is sensed and driving of a motor is stopped when the actual torque reaches to a predetermined reference value.

The first conventional power impact tool which stops the driving of the motor corresponding to the impact number and the second conventional power impact tool which stops the driving of the motor corresponding to the rotation angle respectively have a disadvantage that a large difference may occur between a desired torque and the actual torque for fastening the screw or the bolt. The difference causes loosening of the screw or the bolt due to insufficient torque when the actual torque is much smaller than the desired torque. Alternatively, the difference causes to damage the elements to be fastened by the screw or the bolt or to damage a head of the screw or the bolt due to superfluous torque when the actual torque is much larger than the desired torque.

On the other hand, the third conventional power impact tool which stops the driving of the motor corresponding to the actual torque for fastening the screw or the bolt needs a sensor provided on an output shaft for sensing the actual torque, so that it causes the cost increase and the upsizing of the power impact tool, even though the automatic stopping of the driving of the motor can be controlled precisely corresponding to the actual torque.

For solving the above-mentioned problems, in a fourth conventional power impact tool shown in publication gazette of Japanese Patent Application 2002-283248, a torque for fastening the bolt is estimated according to rotation speed of a shaft of a motor when an impact is applied to the bolt. It is judged that the bolt is completely fastened when the estimated torque is suddenly increased. The driving of the motor is stopped when the estimated torque is suddenly increased.

In the fourth conventional power impact tool, there is a possibility that the driving of the motor is stopped before the bolt is fastened completely, when the torque is temporarily increased due to trouble in fastening operation. In order to prevent the stop of the driving of the motor before the bolt is fastened completely, a reference torque for judging occurrence of trouble is defined, which is a little larger than the largest torque when the torque is temporarily increased due to the trouble. While the estimated torque has not been equal to or larger than the reference torque for judging occurrence of trouble, the driving of the motor is continued, so that the occurrence of malfunction that the driving of the motor is stopped before the bolt is fastened completely can be prevented.

As examples of cause of the trouble in the fastening operation, an irregularity of thread grooves of the bolt, a slight warp of a member interleaved between the bolt and the nut, decentering of the bolt or the nut, clipping of dust between the bolt and the nut, picking off of a surface coating of baking finish on the bolt, lifting of a member interleaved between the bolt and the nut, are recited.

In the fourth conventional power impact tool, it, however, is difficult to distinguish an instantaneous increase of the torque appeared in a variation of the torque due to the trouble in the fastening operation from the increase of the torque due to the bolt is fastened completely, since the variation of the torque while the bolt is fastened is irregular corresponding to combination of the bolt and the object to be fastened. Thus, there is a possibility that the driving of the motor is stopped before the bolt is fastened completely.

SUMMARY OF THE INVENTION

A purpose of the present invention is to provide a power tool used for fastening a screw or a bolt, by which driving of a motor can surely be stopped just when the screw or the bolt is fastened completely.

A power tool used for fastening a screw or a bolt in accordance with an aspect of the present invention comprises: a motor; a motor controller for controlling start and stop of driving of the motor; a power transmitter for transmitting driving force of the motor to a bit for fastening or loosening the screw or the bolt; a torque estimator for estimating a value of a torque for fastening the screw or the volt; and a fastening judger for judging whether the screw or the bolt is fastened completely or not.

The fastening judger calculates a torque variation quantity $\Delta T$ which is a ratio of variation of the torque T with respect to a rotation angle of a shaft of the motor or elapsed time, and a torque variation ratio $\Delta\Delta T$ which is a ratio of the torque variation quantity $\Delta T$ with respect to the rotation angle of the shaft of the motor or elapsed time. Subsequently, the fastening judger further calculates a reference index with using the torque variation ratio $\Delta\Delta T$, which is used for judging whether an increase of the value of the torque T is a temporary increase caused by a trouble in fastening operation or not. The fastening judger judges that the fastening operation is completed at least when the torque variation ratio $\Delta\Delta T$ becomes substantially zero and the reference index becomes equal to or larger than a threshold value of trouble judgment, and outputs a signal for stopping the driving of the motor to the motor controller.

Specifically, the fastening judger can judge that the fastening operation is completed when the torque variation ratio $\Delta\Delta T$ becomes substantially zero after the reference index has become equal to or larger than the threshold value of trouble judgment.

Alternatively, the fastening judger can judge that the fastening operation is completed when the reference index becomes equal to or larger than the threshold value of trouble judgment after the torque variation ratio has become substantially zero.

According to such the configurations, it is possible surely to judge whether the increase of the torque is caused by the trouble or not with using peak curves of the torque variation ratio ΔΔT.

Furthermore, the driving of the motor is stopped a little before the torque for fastening the screw or the bolt becomes maximum value, so that it is especially suitable for fastening the screw or the bolt made of softer material or the smaller screw or the smaller bolt without damaging a head of the screw or the bolt.

Furthermore, the fastening judger can judge that the fastening operation is completed when the value of the torque variation quantity ΔΔT becomes substantially zero after the value of the reference index has become equal to or larger than the threshold value of trouble judgment first and the torque variation ratio has become substantially zero.

Alternatively, the fastening judger can judge that the fastening operation is completed when the value of the torque variation quantity becomes substantially zero after the torque variation ratio has become substantially zero first and the value of the reference index has become equal to or larger than the threshold value of trouble judgment.

According to such the configurations, the driving of the motor is stopped when the torque for fastening the screw or the bolt becomes substantially maximum value, so that it is especially suitable for fastening the screw or the bolt made of harder material or the larger screw or the larger bolt which is rarely damaged.

DETAILED DESCRIPTION OF THE EMBODIMENT

Figure 1:
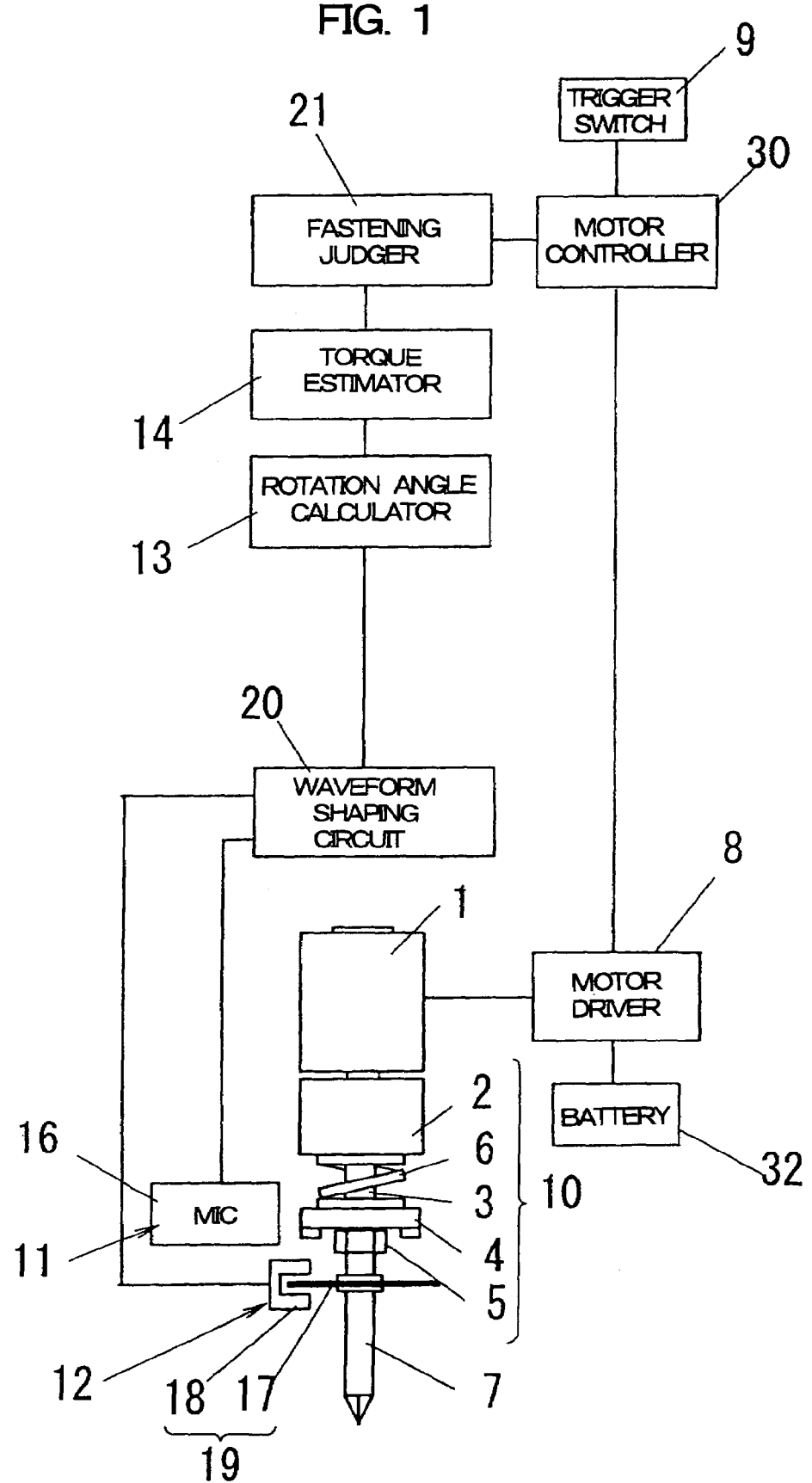
FIG. 1 is a block diagram showing a configuration of a power impact tool, which is an embodiment of a power tool used for fastening a screw or a bolt in accordance with the present invention.

A power tool used for fastening a screw or a bolt in accordance with an embodiment of the present invention is described. FIG. 1 shows a configuration of a power impact tool used for fastening a screw or a bolt as an example of the power tool in the embodiment.

The power impact tool comprises a motor 1 for generating a driving force, and a power transmitter 10 for transmitting the driving force of the motor 1 to a bit 7 for fastening or loosening a screw or a bolt (hereinafter abbreviated as "bolt"). The power transmitter 10 further comprises a reducer 2 for reducing rotation speed of a shaft of the motor 1 (hereinafter abbreviated as rotation speed of the motor 1), a driving shaft 3 connected to the reducer 2 and rotated by the driving force of the motor 1, a hammer 4 engaged with the driving shaft 3 via a spline bearing, an anvil 5 engaged with the driving shaft 3 with a clutch mechanism, and a spring 6 for applying pressing force to the hammer 4 toward the anvil 5.

The hammer 4 can be moved in an axial direction of the driving shaft 3 via the spline bearing, and rotated with the driving shaft 3. The clutch mechanism is provided between the hammer 4 and the anvil 5. The hammer 4 is pressed to the anvil 5 by the pressing force of the spring 6 in an initial state. The bit 7 is detachable fitted to the anvil 5. Thus, the bit 7 can be rotated with the driving shaft 3, the hammer 4 and the anvil 5 by the driving force of the motor 1.

A pair of cam faces is formed on, for example, an upper face of the anvil 5 and a lower face of the hammer 4, which serve as the cam mechanism. For example, when the bolt has been fastened and the rotation of the bit 7 is stopped, the cam face on the hammer 4 slips on the cam face on the anvil 5 owing to the rotation with the driving shaft 3 and the hammer 4 moves in a direction depart from the anvil 5 along the driving shaft 3 following to the elevation of the cam faces against the pressing force of the spring 6. When the hammer 4 goes around, for example, substantially one revolution, the restriction due to the cam faces is suddenly released, so that the hammer 4 impacts the anvil 5 owing to charged pressing force of the spring 6 while it is rotated with the driving shaft 3. Thus, a powerful fastening force can be applied to the bit 7 via the anvil 5, since the mass of the hammer 4 is much larger than that of the anvil 5. By repeating the impact of the hammer 4 against the anvil 5 in the rotation direction, the bolt can be fastened completely with a necessary fastening torque.

The motor 1 is driven by a motor driver 8 so as to start and stop the rotation of the shaft. The motor driver 8 is further connected to a motor controller 30, to which a signal corresponding to a displacement (pressing depth) of a trigger switch 9 is inputted. The motor controller 30 judges user's intention to start or to stop the driving of the motor 1 corresponding to the signal outputted from the trigger switch 9, and outputs a control signal for starting or stopping the driving of the motor 1 to the motor driver 8.

The motor driver 8 is constituted as an analogous power circuit using a power transistor, and so on for supplying large electric current to the motor 8 stably. A rechargeable battery 32 is connected to the motor driver 8 for supplying electric power to the motor 1. On the other hand, the motor controller 30 is constituted by, for example, a CPU (Central Processing Unit), a ROM (Read Only Memory) and a RAM (Random Access Memory) for generating the control signals corresponding to a control program.

The power impact tool further comprises an impact sensor 11 for sensing that the impact of the hammer 4 against the anvil 5 is carried out, a rotation angle sensor 12 for sensing the rotation angle of the anvil 5, a rotation angle calculator 13 for calculating a rotation angle $\Delta r$ of the anvil 5 per one impact of the hammer 4 with using outputs of the impact sensor 11 and the rotation angle sensor 12, and a torque estimator 14 for estimating a torque for fastening the bolt with using the rotation angle $\Delta r$. These elements constitute a means for estimating the torque for fastening the bolt.

Specifically, the impact sensor 11 is a microphone 16 for sensing impact boom generated when the hammer 4 impacts the anvil 5 as a variation of voltage. The rotation angle sensor 12 is a rotary encoder 19 constituted by a disc 17 rotated with the anvil 5 and having slits and a transmission photo-interrupter 18 for sensing the rotation angle of the disc 17. Thus, the rotation angle of the anvil 5 is sensed as pulse signals. The microphone 16 and the rotary encoder 19 are respectively connected to a waveform shaping circuit 20 so as to be executed the filtering process, and the processed signals by the waveform shaping circuit 20 are inputted to the rotation angle calculator 13.

The rotation angle calculator 13 serially calculates the rotation angles $\Delta r$ of the anvil 5 per one impact of the hammer 4, and the torque estimator 14 serially estimates the torque T for fastening the bolt. Since the calculation of the torque T is described in the above-mentioned publication gazette of Japanese Patent Application 2002-283248 in detail, the description of the calculation of the torque T is made simple. The torque T is calculated by the following equation showing the relation that the energy applied by the impact is substantially equal to the energy exhausted in the fastening of the bolt.

$$T = (J \times \omega^2)/(2 \times \Delta r)$$

Hereupon, the symbol T designates the torque for fastening the bolt, the symbol J designates the moment of inertia of the anvil 5, and the symbol $\omega$ designates the rotation speed of the anvil 5 when the impact of the hammer 4 is carried out.

With respect to the rotation speed $\omega$ of the anvil 5, the rotation speed of the motor 1 can be known according to the voltage of the rechargeable battery 32 and the duty in PWM (Pulse Width Modulation) control while the electric current is supplied to the motor 1, and an approximate value of the rotation speed $\omega$ of the anvil 5 can be calculated by executing division of the rotation speed of the motor 1 by the reduction ratio K of the reducer 2. By substituting the rotation angle $\Delta r$ of the anvil 5 per one impact into the above-mentioned equation, the estimated torque can be calculated.

The power impact tool further comprises a fastening judger 21 which calculates a torque variation quantity $\Delta T$ and a torque variation ratio $\Delta \Delta T$ from the estimated torque T calculated by the torque estimator 14 and judges whether the fastening operation of the bolt is completed or not. The torque variation quantity $\Delta T$ corresponds to a ratio of the variation of the torque T for fastening the bolt with respect to the rotation angle of the shaft of the motor 1 or elapsed time. The torque variation ratio $\Delta \Delta T$ corresponds to a ratio of the variation of the torque variation quantity $\Delta T$ with respect to the rotation angle of the motor 1 or elapsed time.

For obtaining the torque variation quantity $\Delta T$ and the torque variation ratio $\Delta \Delta T$, it is possible to calculate a difference between a value calculated in this time and a value previously calculated, simply. It, however, is preferable to calculate a difference between a mean value among a first predetermined number of values of the estimated torque T and the torque variation quantity $\Delta T$ and another mean value among a second predetermined number of the values of them, in order to comprehend the variations of the torque T or the torque variation quantity $\Delta T$ in their entirety. Specifically, the torque variation quantity $\Delta T$ is a difference between a mean value among four values of the estimated torque T and another mean value among sixteen values of the estimated torque T. Similarly, the torque variation ratio $\Delta \Delta T$ is a difference between a mean value among two values of the torque variation quantity $\Delta T$ and another mean value among eight values of the torque variation quantity $\Delta T$.

The fastening judger 21 calculates the above-mentioned torque variation quantity $\Delta T$ and the torque variation ratio $\Delta \Delta T$. Furthermore, the fastening judger 21 judges that the fastening operation is completed at least when a number of the impact of the hammer 4 occurred in a term in which the torque variation ratios $\Delta \Delta T$ continuously take positive values becomes larger than a predetermined threshold value of trouble judgment and the torque variation ratio $\Delta \Delta T$ becomes substantially zero. When the fastening judger 21 judges that the fastening operation is completed, the fastening judger outputs a signal showing that the bolt has been fastened completely to the motor controller 30. The motor controller 30 outputs a control signal for stopping the driving of the motor to the motor driver 8 when it receives the signal from the fastening judger 21.

Figure 2:
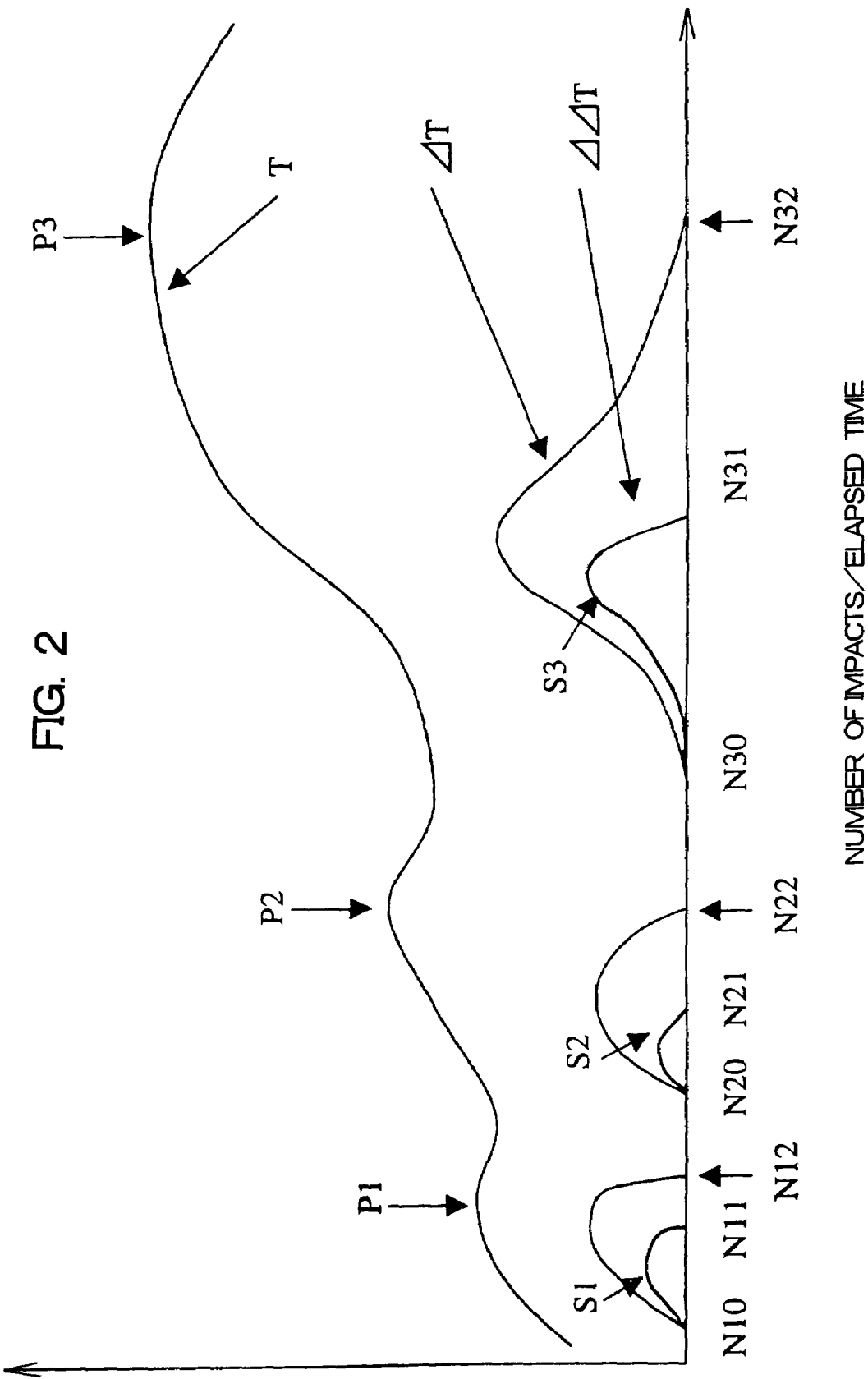
FIG. 2 is a graph showing an example of variations of torque T, torque variation quantity ΔT and torque variation ratio ΔΔT in the fastening operation.

FIG. 2 shows an example of the variations of the torque T, the torque variation quantity $\Delta T$ and the torque variation ratio $\Delta \Delta T$ in the fastening operation of the bolt. As can be seen from FIG. 2, a peak P3 appears on a curve designated by a symbol T showing the variation of the torque T, after the bolt has been fastened completely. A peak curve S3 designated by a symbol $\Delta \Delta T$ showing the variation of the torque variation ratio $\Delta \Delta T$ appears a little before the appearance of the peak P3. It is possible to judge that the bolt has been fastened completely when the peak curve S3 appears. Generally, peaks P1, P2 and so on appear on the curve T due to the above-mentioned troubles in the fastening operation of the bolt, and peak curves S1, S2 and so on further appear correspondingly. The appearance of the peak curves S1, S2, and so on causes malfunction that the driving of the motor 1 has been stopped before the bolt is fastened completely.

In this embodiment, it is noticed that the peak values of the peak curves S1 and S2 due to the troubles are lower than that of the peak curve S3 due to the bolt is fastened completely, so that the number of the impact of the hammer 4 (N11–N10 and N21–N20) occurred due to the trouble in a terms in which the torque variation ratios $\Delta \Delta T$ continuously take positive values is smaller than the number of the impact of the hammer 4 (N31–N30) due to the bolt is fastened completely. The above-mentioned predetermined threshold value of trouble judgment is defined to be larger than the value of the impact of the hammer 4 due to the trouble and smaller than that due to the bolt is fastened completely. Thus, it is possible surly to stop the driving of the motor when the torque for fastening the bolt is increased due to the bolt has been fastened completely without malfunction caused by the increase of the torque due to the trouble.

The fastening judger 21 uses the number of the impact of the hammer 4 in the term in which the torque variation ratios ΔΔT continuously take positive values as a reference index for judging whether the increase of the torque T for fastening the bolt is caused by the trouble or not. Since the value according to the torque variation ratio ΔΔT is adopted as the reference index, the cause of the increase of the torque for fastening the bolt can precisely be judged with using the peak curves S1, S2, S3 . . . of the torque variation ratio ΔΔT. The reference index is not limited to the number of the impact of the hammer 4. It is possible to use the time period of the term in which the torque variation ratios ΔΔT continuously take positive values as the reference index.

Figure 3:
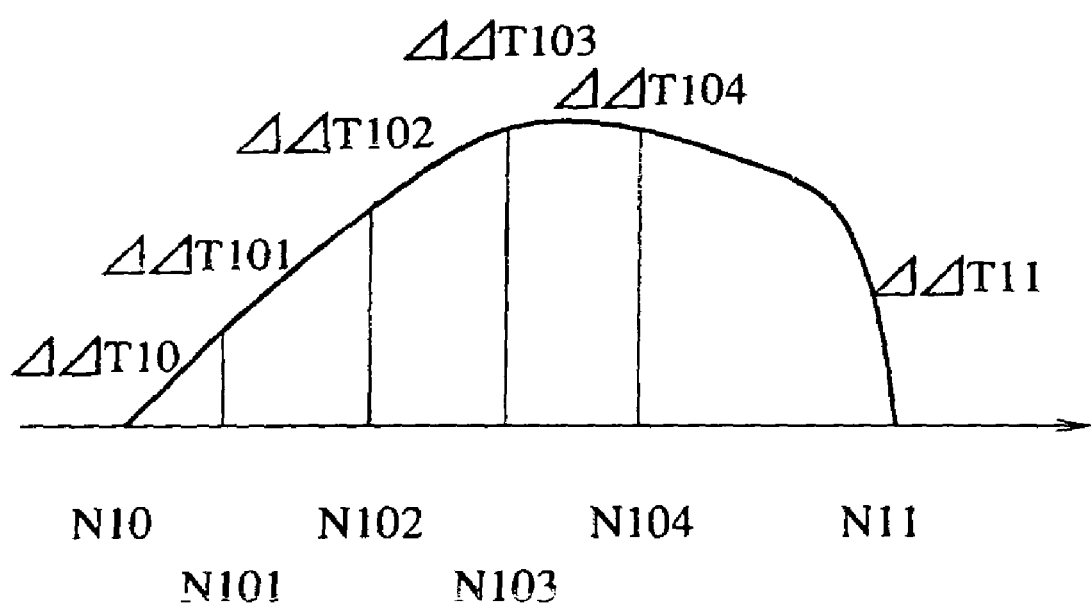
FIG. 3 is a graph showing an enlarged peak curve S1 in FIG. 2.

Furthermore, the threshold value of trouble judgment is not necessarily defined as a predetermined value. It is possible to define a value calculated from a maximum value of the torque variation ratio $\Delta\Delta T_{MAX}$ as the threshold value of trouble judgment. FIG. 3 shows an example of specific values of the torque variation ratio ΔΔT and the impact number of the hammer 4 with respect to the peak curve S1. For example, the threshold value of trouble judgment can be calculated as a value in proportion to the maximum vale of the torque variation ratio $\Delta\Delta T_{MAX}$ ($\Delta\Delta T_{MAX} \times C1$(constant value)). In such the case, the value ΔΔT103 corresponds to the maximum vale of the torque variation ratio $\Delta\Delta T_{MAX}$ in the case shown in FIG. 3, so that the threshold value of trouble judgment is calculated as ΔΔT103×C1. The calculated threshold value of trouble judgment (ΔΔT103×C1) is compared with the number of impact of the hammer 4 (N11−N10) as the reference index. When (N11−N10)>(ΔΔT103×C1), the fastening judger 21 judges that the fastening operation of the bolt has been completed. Alternatively, when (N11−N10)≦(ΔΔT103×C1), the fastening judger 21 judges that the torque has been increased due to a temporary trouble. By such a configuration, even when a large torque variation ratio ΔΔT instantaneously appears due to trouble, the number of impact of the hammer 4 is smaller (or the time period of the peak curve is shorter) in proportion to the intensity of the torque variation ratio ΔΔT. Thus, it is possible to judge the increase of the torque variation ratio ΔΔT is caused by the trouble, so that malfunction that the driving of the motor 1 has been stopped before the bolt is completely fastened can be prevented.

Alternatively, it is possible to adopt a sum Σ(ΔΔT) of values of the torque variation ratios ΔΔT occurred at each impact of the hammer 4 in a term in which the torque variation ratios ΔΔT take positive values as the reference index. It is noticed that the sum Σ(ΔΔT) of values of the torque variation ratios ΔΔT occurred at each impact of the hammer 4 in the term in which the torque variation ratios ΔΔT take positive values due to the trouble becomes smaller than that due to the bolt is fastened completely, since the peak values of the peak curves S1 and S2 due to the trouble are lower than that of the peak curve S3 due to the bolt is fastened completely. In this case, the threshold value of trouble judgment is defined to be larger than the sum Σ(ΔΔT) of values of the torque variation ratios ΔΔT due to the trouble and smaller than the sum Σ(ΔΔT) of values of the torque variation ratios ΔΔT due to the bolt is fastened completely. Thus, it is possible to stop the driving of the motor 1 just when the bolt is fastened completely without malfunction when the torque variation ratio ΔΔT is increased due to the trouble. In the case shown in FIG. 3 which illustrates the peak curve S1 largely, the sum Σ(ΔΔT)= ΔΔT10+ΔΔT101+ΔΔT102+. . . +ΔΔT11. The reference index is not limited to the sum Σ(ΔΔT) of values of the torque variation ratios ΔΔT occurred at each impact of the hammer 4 in the term in which the torque variation ratios ΔΔT take positive values. It is possible to use a value of integration of the torque variation ratio ΔΔT in the term in which the torque variation ratios ΔΔT continuously take positive values as the reference index.

In this case, the threshold value of trouble judgment is not necessarily defined as a predetermined value. It is possible to define a value calculated from a maximum value of the torque variation ratio $\Delta\Delta T_{MAX}$ as the threshold value of trouble judgment. For example, when the threshold value of trouble judgment can be calculated as a value in proportion to the maximum value of the torque variation ratio $\Delta\Delta T_{MAX}$ ($\Delta\Delta T_{MAX} \times C2$(constant value)), the threshold value of trouble judgment is calculated as ΔΔT103×C2. The calculated threshold value of trouble judgment (ΔΔT103×C2) is compared with the sum Σ(ΔΔT) as the reference index. When Σ(ΔΔT)>(ΔΔT103×C2), the fastening judger 21 judges that the fastening operation of the bolt has been completed. Alternatively, when Σ(ΔΔT)≦(ΔΔT103×C2), the fastening judger 21 judges that the torque has been increased due to a temporary trouble. By such a configuration, even when a large torque variation ratio ΔΔT instantaneously appears due to the trouble, the sum Σ(ΔΔT) of the torque variation ratio ΔΔT occurred at each impact of the hammer 4 is smaller in proportion to the intensity of the torque variation ratio ΔΔT. Thus, it is possible to judge the increase of the torque variation ratio ΔΔT is caused by the trouble, so that malfunction that the driving of the motor 1 is stopped before the bolt is fastened completely can be prevented.

Figure 4:
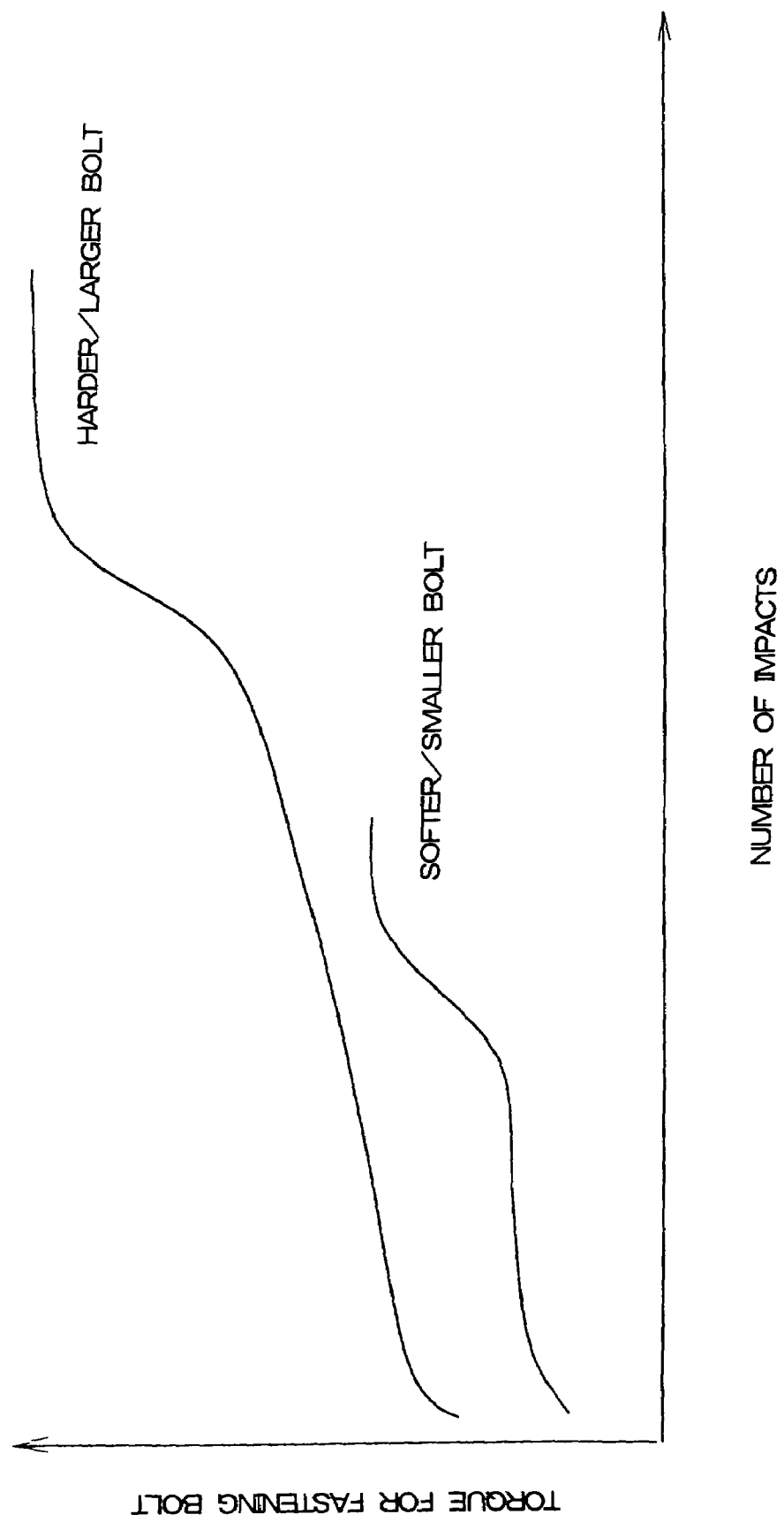
FIG. 4 is a graph showing differences between characteristics corresponding to materials or sizes of bolts, under the assumption that energy of impact of a hammer is the same.

Still furthermore, it is possible to define the threshold value of trouble judgment as a value calculated from an initial value of the torque T in the fastening operation of the bolt. FIG. 4 shows differences between characteristics corresponding to the materials or the sizes of the bolts, under the assumption that the energy of impact of the hammer 4 is the same. As can be seen from FIG. 4, when the material of the bolt is harder, the torque T for fastening the bolt per one impact of the hammer 4 becomes larger. Alternatively, when the material of the bolt is softer or the size of the bolt is smaller, the torque T for fastening the bolt per one impact of the hammer 4 becomes smaller. Since such a tendency carries from the start to the completion of the impact operation of the hammer, it is noticed that the torque T for fastening the bolt becomes entirely smaller, and the torque variation quantity ΔT and the torque variation ratio ΔΔT further become entirely smaller when the torque T at the initial state of the impact operation of the hammer 4. Thus, it is possible to judge that the bolt has been fastened completely without misjudging caused by the increase of the torque due to the trouble with no relation to the kinds of the bolts, when the threshold value of trouble judgment is defined to be a value in proportion to a mean value of the estimated values of the torque T in several times of the impact from the start of the fastening operation of the bolt.

Still furthermore, it is possible to use the value of the torque variation ratio ΔΔT itself as the reference index, and to define the threshold value of trouble judgment as a value calculated from the value of the torque T at the initial state of the fastening operation of the bolt. It is noticed that the torque T, the torque variation quantity ΔT and the torque variation ratio ΔΔT further become entirely smaller when the torque T at the initial state of the fastening operation of the bolt. Thus, it is possible to judge that the bolt has been fastened completely without misjudging caused by the increase of the torque due to the trouble with no relation to the kinds of the bolts, when the threshold value of trouble judgment is defined to be a value in proportion to a mean value of the estimated values of the torque T in several times of the impact from the start of the fastening operation of the bolt.

Figure 5:
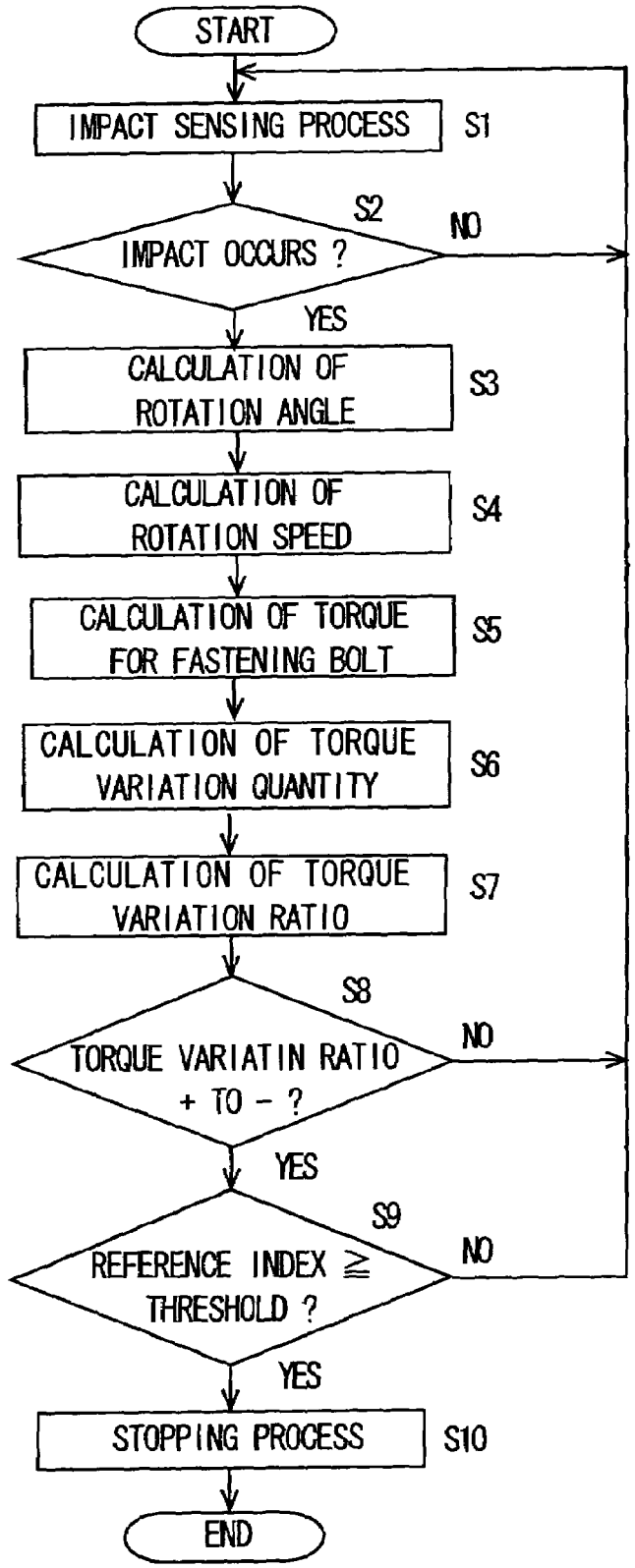
FIG. 5 is a flowchart showing a fastening operation of the power impact tool in the embodiment.

Subsequently, the fastening operation of the power impact tool is described. FIG. 5 shows a basic flow of the fastening operation of the bolt in this embodiment, in which the fastening operation of the bolt is completed when the value of the reference index becomes larger than the threshold value of trouble judgment after the value of the torque variation ratio $\Delta\Delta T$ becomes substantially zero.

When the user operates the trigger switch 9, the motor controller 30 outputs a control signal for starting the driving of the motor 1 so as to fasten the bolt. The impact sensor 11 starts to sense the occurrence of the impact of the hammer 4 (S1). When the impact sensor 11 senses the occurrence of the impact (Yes in S2), the rotation angle calculator 13 calculates the rotation angle $\Delta r$ of the anvil 5 while the hammer 4 impacts the anvil 5 (S3). The rotation angle calculator 13 further calculates the rotation speed $\omega$ of the anvil 5 at the occurrence of the impact (S4). When the rotation angle $\Delta r$ and the rotation speed $\omega$ are calculated, the torque estimator 14 calculates the torque T according to the above-mentioned equation (S5). The fastening judger 21 calculates the torque variation quantity $\Delta t$ and the torque variation ratio $\Delta\Delta T$ (S6 and S7). Subsequently, the fastening judger 21 judges whether the value of the torque variation ratio $\Delta\Delta T$ has changed from positive to negative or not (S8). When the value of the torque variation ratio $\Delta\Delta T$ from positive to negative, that is, the value of the torque variation ratio $\Delta\Delta T$ has become substantially zero, the fastening judger 21 further judges whether the value of the reference index becomes equal to or larger than the threshold value of trouble judgment or not (S9). When the value of the reference index is not equal to or larger than the threshold value of trouble judgment, the fastening judger 21 judges that the increase of the torque T is due to the trouble, and returns to the step S1. Alternatively, when the value of the reference index becomes equal to or larger than the threshold value of trouble judgment, the fastening judger 21 judges that the increase of the torque T is due to the bolt has been fastened completely, and executes the stopping process for stopping the driving of the motor 1 (S10).

In reference to FIG. 2, the driving of the motor 1 is stopped when the torque variation ratio $\Delta\Delta T$ becomes substantially zero, which is designated by a symbol N31. The peak P3 of the torque T, however, appears after the torque variation ratio $\Delta\Delta T$ becomes substantially zero, which is designated by, for example, a symbol N32. In other words, the fastening operation of the bolt has been completed a little before the torque T for fastening the bolt takes the maximum value. Thus, this example is suitable for the bolt made of softer material or the smaller bolt, which can easily be damaged by superfluous torque in the fastening operation.

Figure 6:
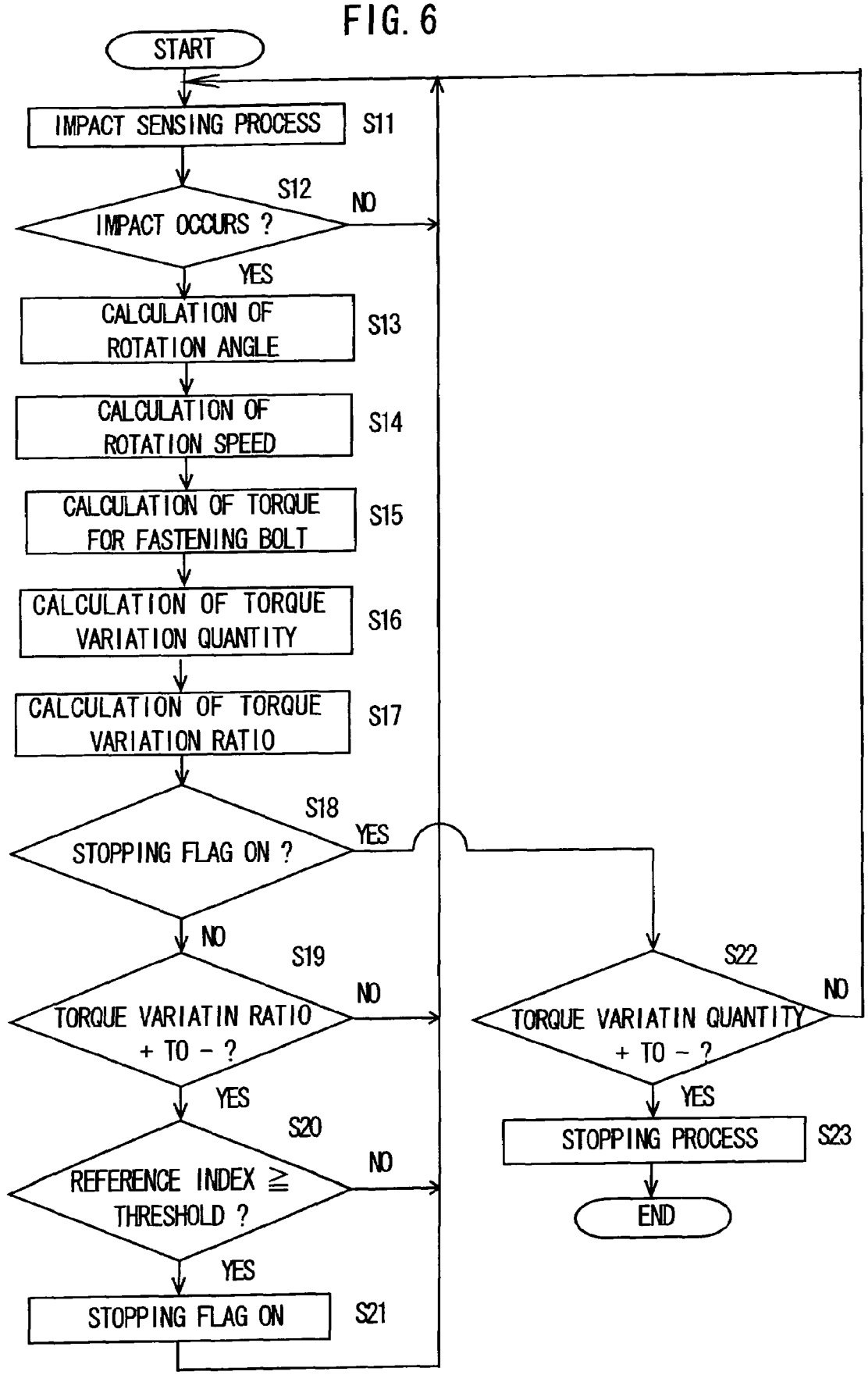
FIG. 6 is a flowchart showing a modification of the fastening operation of the power impact tool in the embodiment.

Thus, a modified operation of the power impact tool is described. FIG. 6 shows a modified flow of the impact sensing operation in this embodiment, in which the fastening operation of the bolt is completed when the value of the torque variation quantity $\Delta T$ becomes substantially zero after the torque variation ratio $\Delta\Delta T$ has become substantially zero first and the value of the reference index has become equal to or larger than the threshold value of trouble judgment. In the flow shown in FIG. 6, the steps from S11 to S17 are substantially the same as the steps from S1 to S7 in the flow shown in FIG. 5, so that the description of them are omitted.

After the fastening judger 21 has calculated the torque variation quantity $\Delta t$ and the torque variation ratio $\Delta\Delta T$ (S16 and S17), the fastening judger 21 judges whether a stopping flag for executing stopping process has been turned on or not (S18). Generally, the stopping flag has not been turned on, so that the fastening judger 21 judges whether the value of the torque variation ratio $\Delta\Delta T$ has changed from positive to negative or not (S19). When the value of the torque variation ratio $\Delta\Delta T$ has changed from positive to negative, the fastening judger 21 further judges whether the value of the reference index becomes equal to or larger than the threshold value of trouble judgment or not (S20). When the value of the reference index is not equal to or larger than the threshold value of trouble judgment, the fastening judger 21 judges that the increase of the torque T is due to the trouble, and returns to the step S11. Alternatively, when the value of the reference index is equal to or larger than the threshold value of trouble judgment, the fastening judger 21 judges that the increase of the torque T is due to the bolt has been fastened substantially completely, turns on the stopping flag for executing the stopping process (S21), and returns to the step S11.

When the flow returns to the step S11, the steps S12 to S18 are executed again. In the step S18 second accession, since the flag has been turned on, the fastening judger 21 judges whether the value of the torque variation quantity $\Delta T$ has changed from positive to negative or not (S22). When the value of the torque variation quantity $\Delta T$ has changed from positive to negative, the fastening judger 21 judges that the increase of the torque T is due to the bolt has been fastened completely, and executes the stop operation for stopping the driving of the motor 1 (S23). Alternatively, when the value of the torque variation quantity $\Delta T$ has not changed from positive to negative, the fastening judger 21 judges that the bolt has not been fastened completely, and returns to the step S11 so as to repeat the above-mentioned processes.

In the latter case, the motor 1 is further driven after the torque variation ratio $\Delta\Delta T$ becomes substantially zero, so that the bolt can be fastened by substantially the maximum value of the torque. Thus, this modification is suitable for the bolt made of harder material or the larger bolt, which is rarely damaged by the superfluous torque in the fastening operation.

The above-mentioned two-types of the fastening control can be switched by operation of the user (operation switch is not illustrated), so that it is possible to carry out the fastening operation corresponding to the characteristics of the object to be fastened. Alternatively, it is possible to switch the above-mentioned two-types of the fastening control automatically corresponding to the value of the torque T when the torque variation ratio $\Delta\Delta T$ becomes substantially zero. Specifically, the fastening judger 21 judges whether the value of the torque T is larger than a predetermined reference value or not when the torque variation ratio $\Delta\Delta T$ becomes substantially zero. When the value of the torque T is not larger than the predetermined reference value, the fastening judger 21 judges that the fastening operation of a bolt made of softer material or a smaller bolt has been completed, and the motor controller 30 outputs a control signal for stopping the driving of the motor 1 to the motor driver 8. Alternatively, when the value of the torque T is larger than the predetermined reference value, the fastening judger 21 further judges whether the torque variation quantity $\Delta T$ becomes zero, or not. When the torque variation quantity $\Delta T$ becomes zero, the fastening judger 21 judges that the fastening operation of a bolt made of harder material or a larger bolt has been completed, and the motor controller 30 outputs a control signal for stopping the driving of the motor 1 to the motor driver 8.

Subsequently, a modification of the power impact tool in this embodiment is described. It is possible that the motor controller 30 and the motor driver 8 serve as an automatic speed controller for adjusting the rotation speed of the motor 1 corresponding to the torque T for fastening the bolt in the initial state of the fastening operation. For example, the motor controller 30 compares a mean value of the estimated values of the torque T at several times of the impact of the hammer 4 from the start of the fastening operation with a predetermined reference value. When the mean value of the torque T is smaller than the reference value, the motor controller 30 judges that the bolt made of softer or the smaller bolt is fastened, and outputs a signal for reducing the rotation speed of the motor 1 to the motor driver 8. Thus, it is possible to reduce the energy of the impact by reducing the rotation speed of the motor 1 when the bolt made of the softer material or the smaller bolt, which can be damaged easily, is fastened.

Since the energy of the impact is reduced, the number of the impacts necessary for completing the fastening of the bolt increases, so that the quantity of the data used for judging that the bolt is completely fastened in the fastening judger 21. Thus, it becomes easy to judge the completion of the fastening of the bolt, precisely. Furthermore, it is preferable that the control signal outputted from the motor controller 30 makes the rotation speed of the motor 1 slower corresponding to the degree of the value of the torque T in the initial state. Specifically, a desired value $V_D$ of the rotation speed of the motor 1 is to be in proportion to the mean value $V_M$ of the estimated values of the torque T in several numbers of the impacts from the start of the impact operation. The value $V_D$ is, for example, calculated by the following equation.

$$V_D = V_N \times V_M \times C3$$

Hereupon, the symbol $V_N$ designates the rotation speed of the motor 1 at the present, and the symbol C3 designates a constant. When the desired value $V_D$ becomes larger than the rotation speed $V_N$ at the present, that is, when the rotation speed of the motor 1 is necessary to be increased, the rotation speed of the motor 1 should be maintained as it is ($V_D = V_N$). By such the configuration, the degree of the reduction of the rotation speed of the motor 1 can be made minimum, so as to prevent the large extension of the working time of the fastening operation due to the reduction of the rotation speed of the motor 1.

In other words, the motor controller 30 and the motor driver 8 serving as the automatic speed controller controls the motor 1 in a manner so that the smaller the torque in the initial state of the fastening operation is, the slower the rotation speed of the motor 1 becomes.

Figure 7:
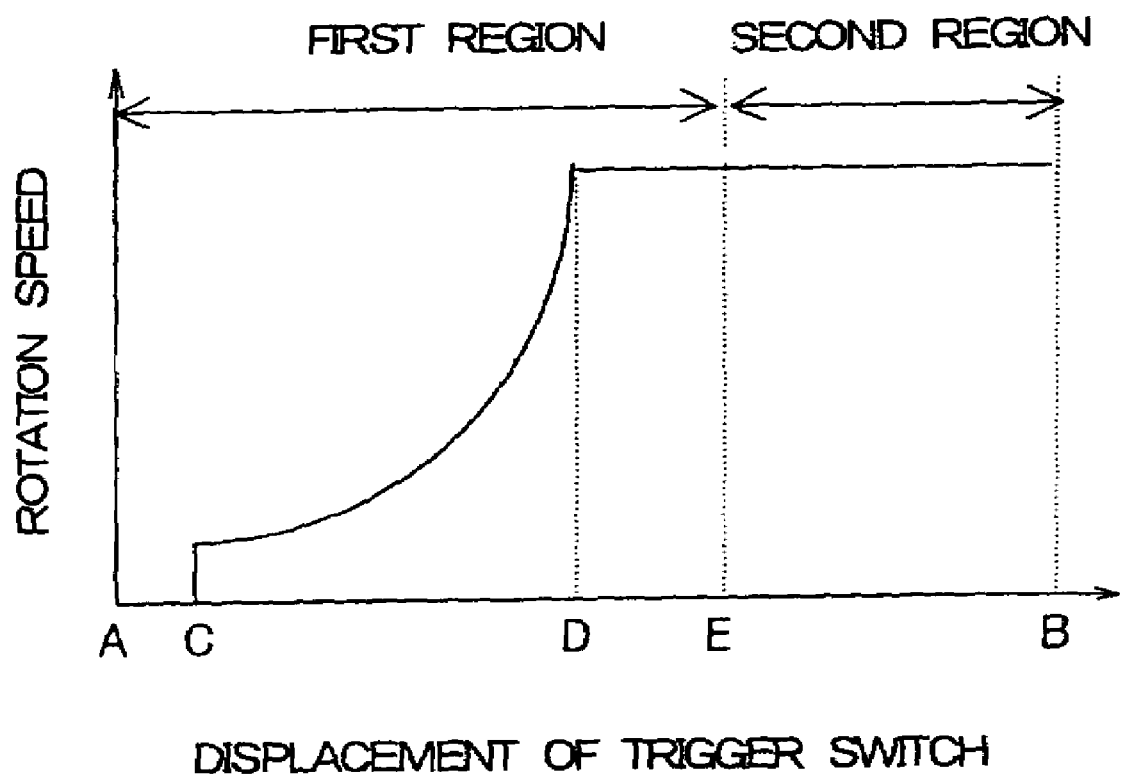
FIG. 7 is a graph showing a relation between a displacement of a trigger switch and a variation of voltage outputted from the trigger switch, and a relation between a first region and a second region in the power impact tool in the embodiment.

Another modification of the power impact tool in this embodiment is described with reference to FIGS. 7 and 8A to 8C. As shown in FIG. 7, a stroke of the trigger switch 9 is divided into a first region and a second region so as to assure the fastening operation of the bolt. In the first region of the stroke of the trigger switch 9, the output of the control signal for stooping the driving of the motor 1 is restricted, and in the second region of the stroke of the trigger switch 9, the output of the control signal for stooping the driving of the motor 1 is permitted, even when the fastening judger 21 judges that the bolt has been fastened completely.

Figure 8:
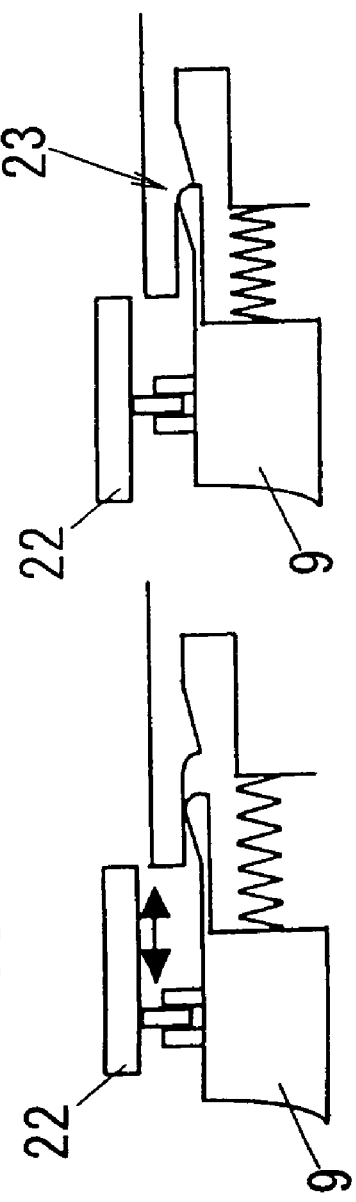
FIGS. 8A to 8C are schematic sectional side views showing the displacement of the trigger switch.

As shown in FIGS. 8A to 8C, the trigger switch 9 is connected to a variable resistor 22 so that the displacement of the trigger switch 9 is converted to the variation of the voltage. A section from point A to point C in FIG. 7 is a mechanical allowance, in which the electric power is not supplied to the motor 1. A section from point C to point D in FIG. 7 is a speed control region, in which the rotation speed of the motor 1 is increased corresponding to increase of the displacement of the trigger switch 9. A section from point D to point B in FIG. 7 is a constant speed region, in which the rotation speed of the motor 1 is maintained as the maximum speed. The boundary between the first region and the second region is selected at point E in the section from the point D to the point B. The first region is defined as the left side from the point E, in which the displacement of the trigger switch 9 is smaller than a predetermined value at the point E. The second region is defined as the right side from the point E, in which the displacement of the trigger switch 9 is equal to or larger than a predetermined value at the point E.

Accordingly, the user can carry out the fastening operation of the bolt with adjusting the rotation speed of the motor 1 in the first region including the speed control region until the user confirms the bolt is fastened by visual observation. Subsequently, the user can continue the fastening operation with pushing the trigger switch 9 into the second region after observing the bolt is in a state just before it is completely fastened. By such a configuration, the fastening operation of the bolt can surely be completed without stopping the driving of the motor before the bolt is completely fastened, even when the fastening judger 21 has erroneously judged the bolt has been fastened completely due to the trouble. A click mechanism 23 is provided for applying a feel to the user when the trigger switch 9 reaches to the point E, so that the user can easily recognize the transition from the first region to the second region.

Figure 9:
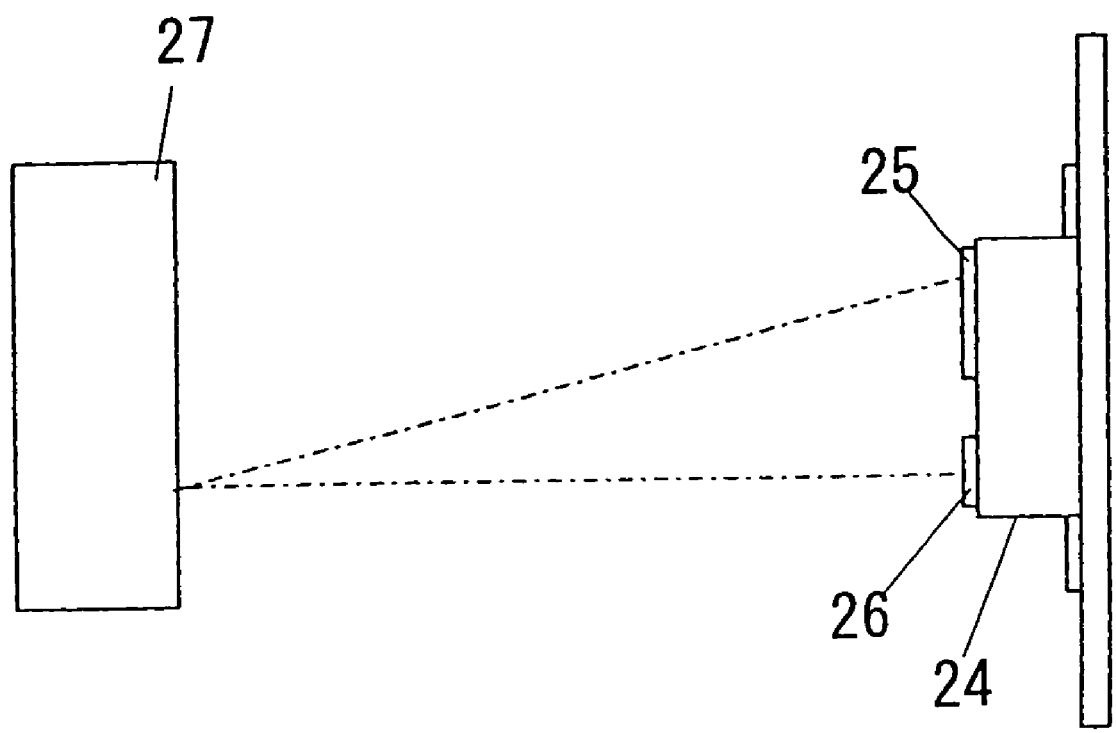
FIG. 9 is a schematic view of a displace sensor used in a modification of the power impact tool in the embodiment.

Still another modification of the power impact tool in this embodiment is described with reference to FIG. 9. It is possible to use a distance sensor 24 for sensing a distance to a face of an object 27 to be fastened by the bolt. The distance sensor 24 comprises a light emitting device 25 and a photo-sensing device 26. A light beam emitted from the light emitting device 25 is focused on the object 27 by a lens (not shown), and a reflected beam from the object 27 is received by the photo-sensing device 26, so that the distance to the object 27 from the distance sensor 24 can be sensed. The distance sensor 24 compares a measurement result of a distance to the object 27 with a predetermined reference distance, and outputs a sensing signal when the measurement result is shorter than the reference distance.

The distance sensor 24 is provided at a stationary portion of the power impact tool in the vicinity of the bit 7. For example, a distance, which is a little longer than a distance from the distance sensor 24 to a surface of the object 27 when the bolt is completely fastened, is defined as the reference distance. Thus, the sensing signal can be outputted from the distance sensor 24 just before the bolt is actually fastened completely. While the sensing signal has not been outputted, no control signal for stopping the driving of the motor 1 is outputted from the motor controller 30 to the motor driver 8, even when the fastening judger 21 has erroneously judged the bolt has been fastened completely. Alternatively, while the sensing signal has been outputted, a control signal for stopping the driving of the motor 1 can be outputted from the motor controller 30 to the motor driver 8, when the fastening judger 21 has judged the bolt has been fastened completely. By such a configuration, it is possible to carry out the fastening operation of the bolt easily without stopping the driving of the motor 1 before the bolt is actually fastened completely. Furthermore, the user can be gut off from the visible observation to confirm the bolt has been fastened substantially completely.

Figure 10:
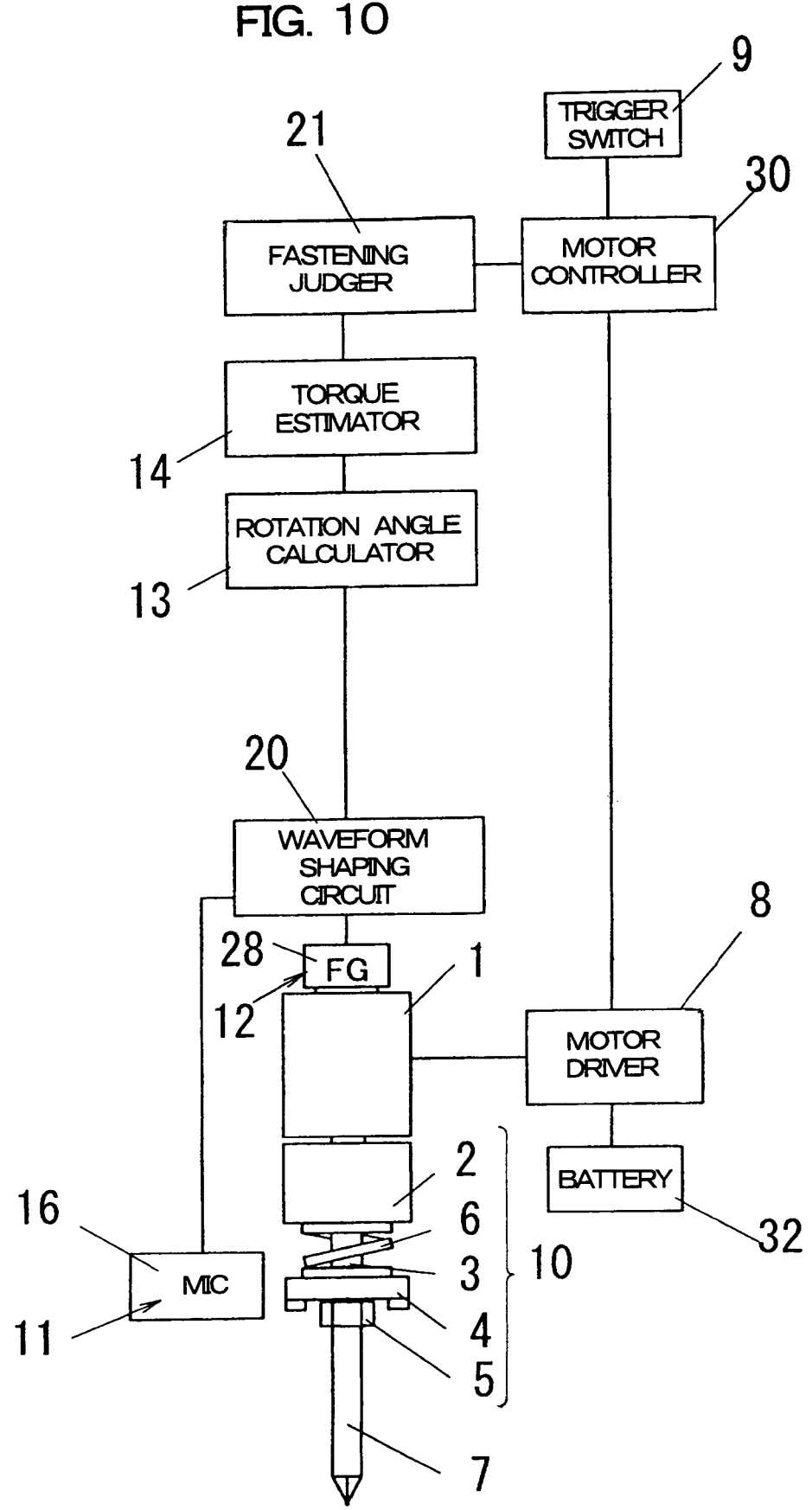
FIG. 10 is a block diagram showing another modification of the power impact tool in the embodiment.

Still other modifications of the power impact tool in this embodiment are described with reference to FIGS. 10, 11 and 12. In the modification shown in FIG. 10, a frequency generator (FG) 28 is used as the rotation angle sensor 12 for sensing rotation angle and rotation quantity of the shaft of the motor 1, instead of the rotary encoder 19. The frequency generator 28 is coupled with the shaft of the motor 1 so that the frequency generator 28 generates frequency signals in proportion to the rotation angle of the shaft of the motor 1. The frequency signals are inputted to the rotation angle calculator 13 via the waveform shaping circuit 20. The rotation angle calculator 13 calculates the rotation angle $\Delta r$ of the anvil 5 with using the following equation at each time when the microphone 16 serving as the impact sensor 11 senses the impact of the hammer 4.

$$\Delta r = \Delta RM/K \cdot RI$$

Hereupon, the symbol $\Delta RM$ designates a rotation angle of the shaft of the motor 1 while the hammer 4 impacts the anvil 5 each time, the symbol K designates a reduction ratio of the reducer 2, and the symbol RI designates an idle angle of the hammer 4. For example, when the hammer 4 impacts the anvil 5 twice, in one revolution of the hammer 4, the idle angle $RI=2\pi/2=\pi$. When the hammer 4 impacts the anvil 5 thrice in one revolution of the hammer 4, the idle angle $RI=2\pi/3$.

Figure 11:
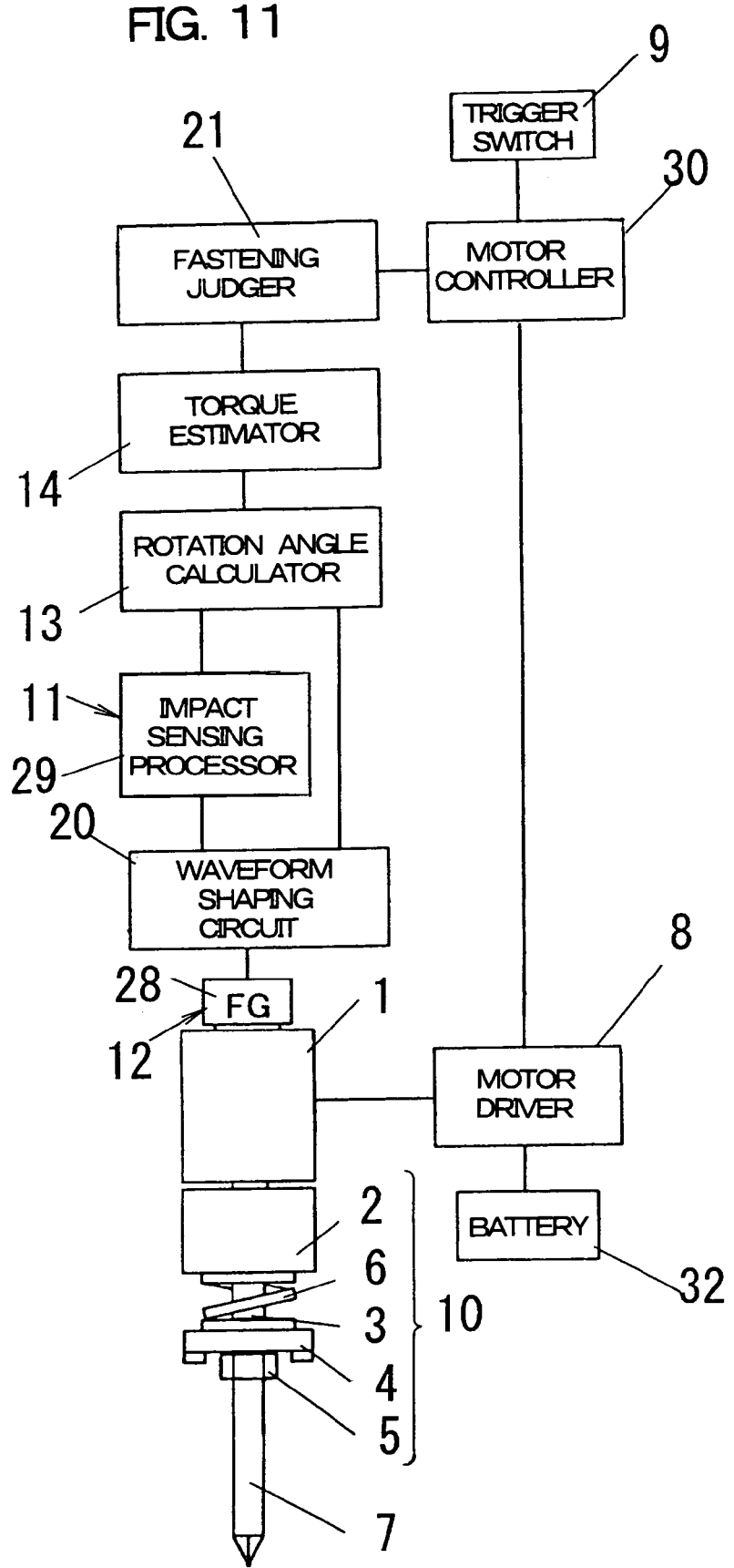
FIG. 11 is a block diagram showing still another modification of the power impact tool in the embodiment.

In the modification shown in FIG. 11, the frequency generator 28 is used not only as the rotation angle sensor 12, but also as the impact sensor 11 instead of the microphone 16. Specifically, the rotation speed of the motor 1 is reduced a little due to load fluctuation when the hammer 4 impacts the anvil 5, and the pulse width of the frequency signal outputted from the frequency generator 28 becomes a little wider. An impact sensing processor 29 senses the variation of the pulse width of the frequency signal as the occurrence of the impact.

Figure 12:
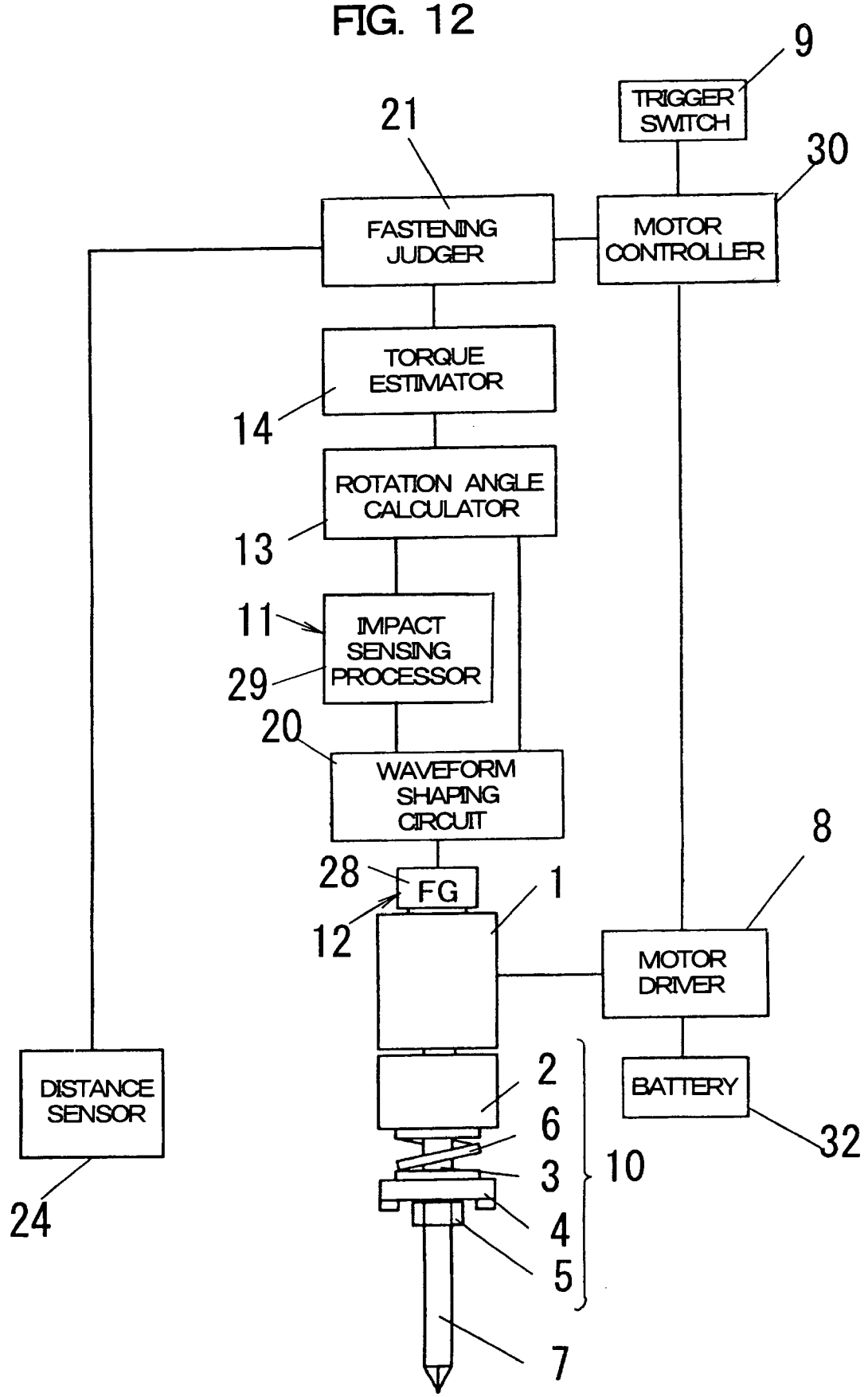
FIG. 12 is a block diagram showing still another modification of the power impact tool in the embodiment.

It is possible that the distance sensor 24 is further provided on the power impact tool as illustrated in FIG. 12. Since the modification of the power impact tool in this embodiment is not limited by the description and the illustration, it is possible to combine the features of the modifications, for example, the rotary encoder 19 serving as the rotation angle sensor 12 and the frequency generator 28 serving as the impact sensor 11. Furthermore, it is possible to use an acceleration sensor as the impact sensor 11.

Still furthermore, a modification of a method for judging that the bolt has been fastened completely in the power impact tool in this embodiment is described. It is possible to judge that the fastening operation of the bolt has been completed when the rotation angle of the bolt attains to a predetermined reference rotation angle $\theta_R$. The control signal for stopping the driving of the motor 1 is outputted from the motor controller 30 to the motor driver 8 when it is judged that the fastening operation has been completed. The reference rotation angle $\theta_R$ is defined as a value corresponding to the mean value $T_M$ of the torque T in several times of the impact from the start of the fastening operation, so that the reference rotation angle $\theta_R$ becomes suitable corresponding to a kind of the bolt. Specifically, the reference rotation angle $\theta_R$ is obtained as a division of the mean value $T_M$ of the torque T and a constant C4 ($\theta_R=T_M/C4$).

According to the above-mentioned judging process, when the mean value $T_M$ of the torque T in the initial state of the fastening operation of the bolt is larger, the fastening judger 21 judges that the bolt is made of harder material or the bolt is larger, and the reference rotation angle $\theta_R$ is set to be smaller. Alternatively, when the mean value $T_M$ of the torque T in the initial state of the fastening operation is smaller, the fastening judger 21 judges that the bolt is made of softer material or the bolt is smaller, and the reference rotation angle $\theta_R$ is set to be larger. Consequently, the fastening operation corresponding to the kind of the bolt can be carried out. Furthermore, the judgment process of the completion of the fastening operation executed by the CPU can be made simple without using the torque variation quantity $\Delta t$ and the torque variation ratio $\Delta\Delta T$, so that the cost of the power impact tool can be reduced owing to the capacity of the RAM can be made smaller.

Figure 13:
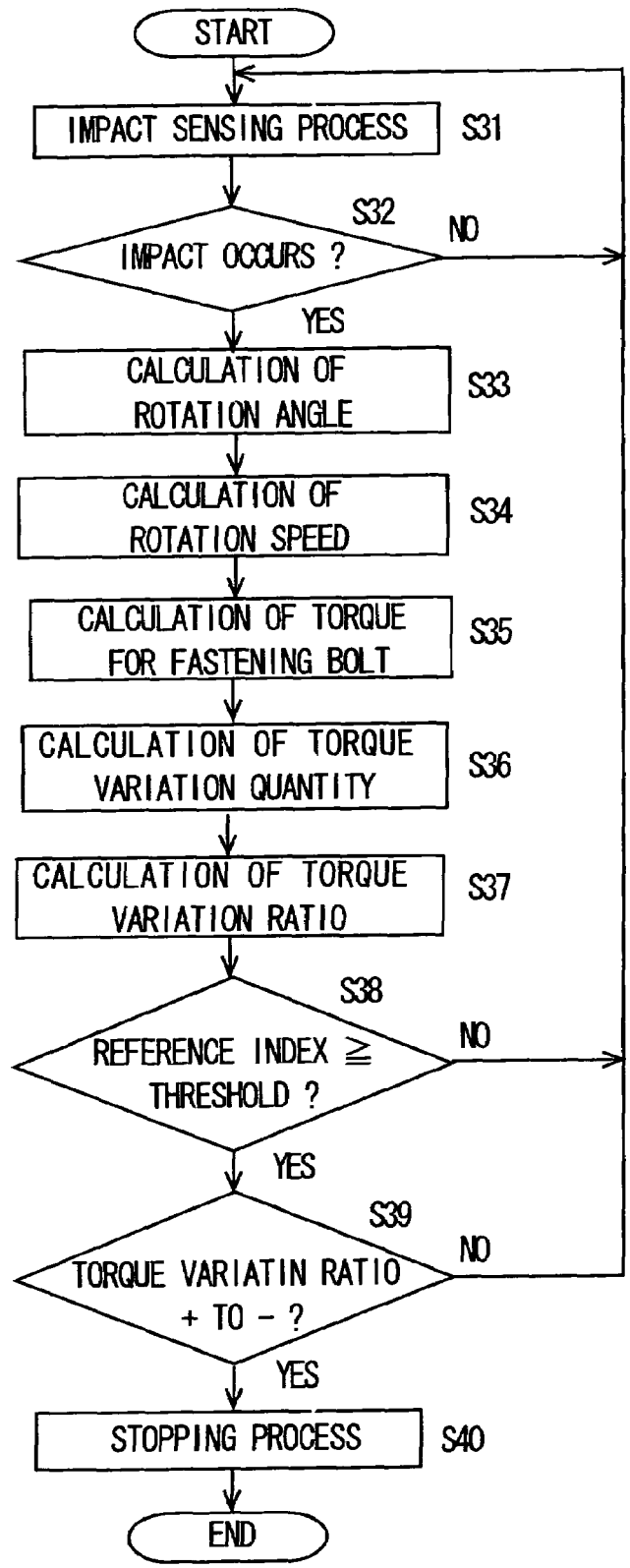
FIG. 13 is a flowchart showing another modification of the fastening operation of the power impact tool in the embodiment.

Subsequently, modifications of the fastening operation of the power impact tool are described with reference to FIGS. 13 and 14. FIG. 13 shows a modification of the fastening operation shown in FIG. 5. In the above-mentioned flow shown in FIG. 5, the fastening operation of the bolt is completed when the value of the reference index becomes equal to or larger than the threshold value of trouble judgment after the value of the torque variation ratio $\Delta\Delta T$ has become substantially zero. On the other hand, in the flow shown in FIG. 13, the fastening operation of the bolt is completed when the value of the torque variation ratio $\Delta\Delta T$ becomes substantially zero after the value of the reference index has become equal to or larger than the threshold value of trouble judgment.

In comparison with FIG. 13 and FIG. 5, the steps S31 to S37 and S40 in FIG. 13 are the same as the steps S1 to S7 and S10 in FIG. 5. The step S38 in FIG. 13 is substantially the same as the step S9 in FIG. 5. The step S39 in FIG. 13 is substantially the same as the step S8 in FIG. 5. Thus, detailed description of each step is omitted. By such the configuration, substantially the same effect as that of the above-mentioned embodiment shown in FIG. 5 can be obtained.

Figure 14:
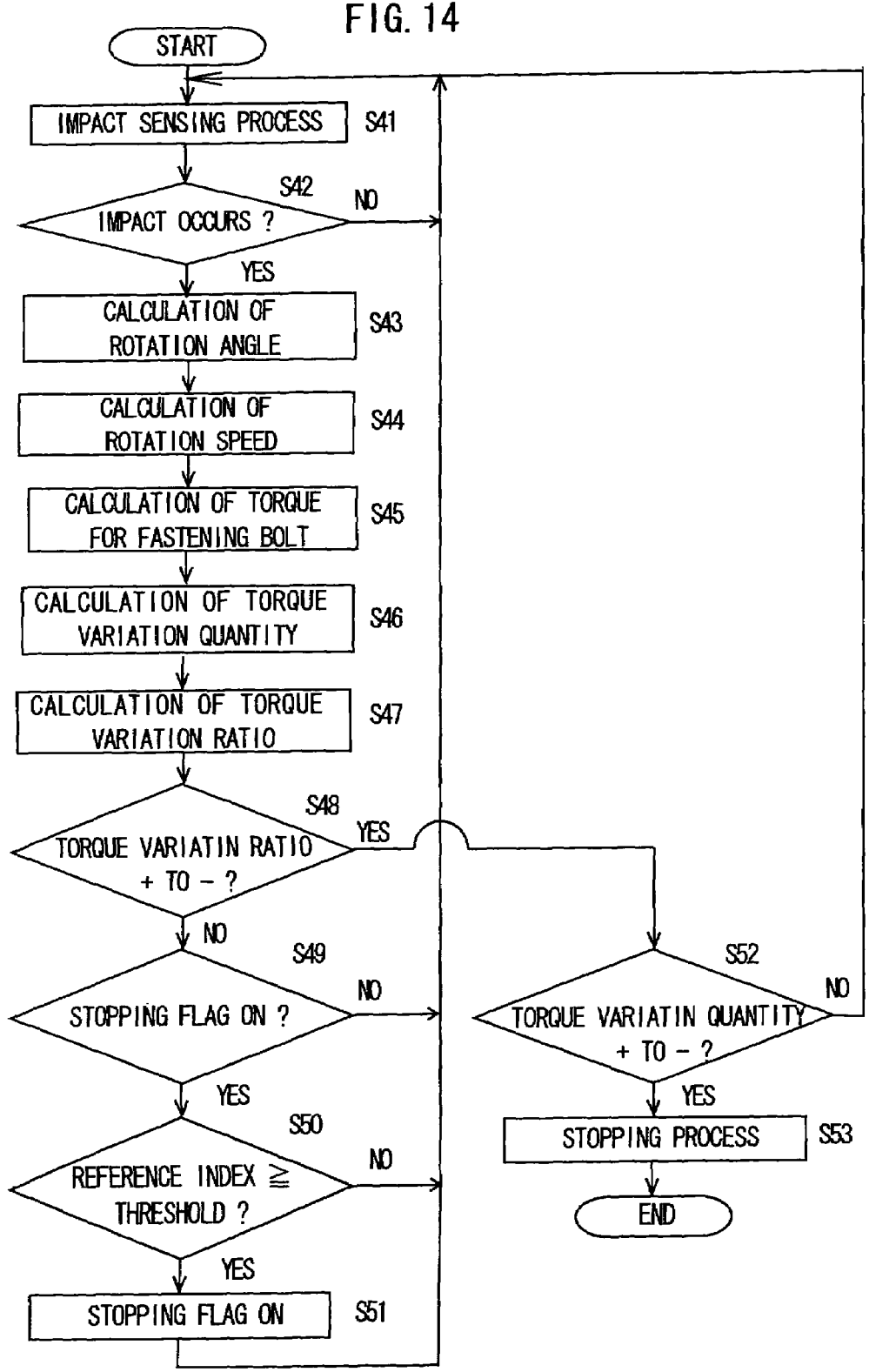
FIG. 14 is a flowchart showing still another modification of the fastening operation of the power impact tool in the embodiment.

Similarly, FIG. 14 shows a modification of the fastening operation shown in FIG. 6. In comparison with FIG. 14 and FIG. 6, the steps S41 to S48, S52 and S53 in FIG. 14 are the same as the steps S11 to S18, S22 and S23 in FIG. 6. The step S49 in FIG. 14 is substantially the same as the step S20 in FIG. 6. The step S50 in FIG. 14 is substantially the same as the step S19 in FIG. 6. By such the configuration, substantially the same effect as that of the above-mentioned embodiment shown in FIG. 6 can be obtained.

In the above-mentioned embodiment, the power impact tool such as the impact wrench is described as an example of the fastening tool in accordance with the present invention. The present invention, however, is not limited the embodiment. It is possible to apply the present invention to a non-impact fastening tool. In case of non-impact fastening tool, a time period of the driving of the motor 1 can be sensed as the reference index instead of the number of the impacts.

This application is based on Japanese patent application 2003-301899 filed Aug. 26, 2003 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A power tool for fastening a screw or bolt comprising:
   a motor;
   a motor controller for controlling operation of the motor;
   a power transmitter for transmitting driving force of the motor to a bit for fastening or loosening a screw or bolt;
   a torque estimator for estimating a value of a torque necessary for fastening the screw or the bolt; and
   a fastening judger for judging whether the screw or bolt is fastened completely or not; the fastening judger being configured to:
   calculate a torque variation quantity which is a ratio of torque variation with respect to a rotation angle of a shaft of the motor, and a torque variation ratio value which is a ratio of the torque variation quantity with respect to the rotation angle of the shaft of the motor;
   calculate a reference index using the torque variation ratio value, for judging whether or not an increase of the value of the torque is a temporary increase due to trouble in a fastening operation;
   judge that the fastening operation is completed at least when the torque variation ratio value becomes substantially zero and the reference index becomes equal or larger than a trouble threshold value which indicates whether or not trouble has occurred in the fastening operation; and
   outputs a signal to stop driving the motor to the motor controller when the fastening operation is completed.

2. The power tool according to claim 1, wherein the fastening judger judges that the fastening operation is completed when the torque variation ratio value becomes substantially zero after the reference index has become equal to or larger than the trouble threshold value.

3. The power tool according to claim 1, wherein the fastening judger judges that the fastening operation is completed when the torque variation quantity becomes substantially zero after, first, the torque variation ratio value has become substantially zero and, second, the value of the reference index has become equal to or larger than the trouble threshold value.

4. The power tool according to claim 1, wherein the fastening judger judges that the fastening operation is completed when the reference index becomes equal to or larger than the trouble threshold value after the torque variation ratio value has become substantially zero.

5. The power tool according to claim 1, wherein the fastening judger judges that the fastening operation is completed when the torque variation quantity becomes substantially zero after, first, the value of the reference index has become equal to or larger than the trouble threshold value and, second, the torque variation ratio value has become substantially zero.

6. The power tool according to claim 1, wherein the reference index comprises a period of time in which the torque variation ratio values are positive.

7. The power tool according to claim 1, wherein the reference index comprises a number of impacts of a hammer in a time period in which the torque variation ratio values are positive where the power tool is an impact power tool.

8. The power tool according to claim 1, wherein the reference index comprises an integration value of the torque variation ratio value over a time period in which the torque variation ratio values are positive.

9. The power tool according to claim 1, wherein the reference index is a sum of the torque variation ratio values occurring at each impact of a hammer over a time period in which the torque variation ratio values are positive where the power tool is a power impact tool.

10. The power tool according to claim 1, wherein the trouble threshold value is calculated by using a maximum torque variation ratio value over a time period in which the torque variation ratio values are positive.

11. The power tool according to claim 1, wherein the trouble threshold value of is calculated by using a value of the torque during the initial state of the fastening operation.

12. The power tool according to claim 1, wherein the reference index is related to the torque variation ratio value, and the trouble threshold value is calculated by using a value of the torque during the initial state of the fastening operation.

13. The power tool according to claim 1 further comprising:
    an automatic speed controller for reducing the rotation speed of the shaft of the motor when the torque during the initial state of the fastening operation is smaller than a predetermined reference value of the torque.

14. The power tool according to claim 13, wherein the automatic speed controller controls the motor in a manner such that the smaller the torque during the initial state of the fastening operation, the slower the rotation speed of the shaft of the motor becomes.

15. The power tool according to claim 1 further comprising:
    a trigger switch operated by a user and outputting signals for controlling at least starting and stopping of the driving of the motor corresponding to a displacement of the trigger switch; and wherein
    a stroke of the trigger switch is divided into a first region in which the motor controller is restricted from stopping driving of the motor, and a second region in which the motor controller is permitted to stop driving of the motor.

16. The power tool according to claim 1 further comprising:
    a distance sensor for sensing a distance to a surface to which a head of the screw or the bolt is to be tightly fastened; and wherein
    the motor controller stops driving the motor after the distance sensed by the distance sensor reaches a reference distance for judging that the screw or the bolt has been completely fastened.

17. The power tool according to claim 1, further comprising a manually operable trigger switch configured to control the motor in association with a displacement of the trigger switch, a stroke of the trigger switch being divided into first and second regions, a speed of the motor being varied in accordance with displacement of the trigger switch in the first region and the speed of the motor being fixed when the trigger switch is displaced into the second region.

* * * * *

UNITED STATES PATENT AND TRADEMARK OFFICE
CERTIFICATE OF CORRECTION

| | | |
|---|---|---|
| PATENT NO. | : 6,978,846 B2 | Page 1 of 1 |
| APPLICATION NO. | : 10/924979 | |
| DATED | : December 27, 2005 | |
| INVENTOR(S) | : K. Kawai et al. | |

It is certified that error appears in the above-identified patent and that said Letters Patent is hereby corrected as shown below:

At column 16, line 13 (claim 11, line 2) of the printed patent, after "valve" delete "of".

Signed and Sealed this

Twenty-ninth Day of August, 2006

JON W. DUDAS
*Director of the United States Patent and Trademark Office*